United States Patent [19]

Ferree, Jr. et al.

[11] 4,297,260
[45] Oct. 27, 1981

[54] ERASABLE WRITING MEDIUM COMPOSITION

[75] Inventors: William I. Ferree, Jr.; Giao V. Nguyen, both of Dallas, Tex.

[73] Assignee: Liquid Paper Corporation, Dallas, Tex.

[21] Appl. No.: 95,574

[22] Filed: Nov. 19, 1979

[51] Int. Cl.³ .............................................. C08K 5/17
[52] U.S. Cl. ..................... 260/29.7 H; 260/29.7 N; 260/29.7 NE; 260/42.21
[58] Field of Search .................. 260/29.7 H, 29.7 SE, 260/29.7 SQ, 29.7 E, 42.21, 29.7 N, 29.7 NE; 106/22

[56] References Cited

U.S. PATENT DOCUMENTS

| | | | |
|---|---|---|---|
| 3,353,972 | 11/1967 | Sinclair | 106/22 |
| 3,385,728 | 5/1968 | Walsh | 260/29.7 H |
| 3,513,570 | 5/1970 | Dil Pare | 35/66 |
| 3,563,782 | 2/1971 | Liberman | 117/37 |
| 3,597,244 | 8/1971 | Fookson | 260/42.21 |
| 3,823,110 | 7/1974 | Epple | 260/29.7 E |
| 3,834,823 | 9/1974 | Seregely | 401/198 |
| 3,845,066 | 10/1974 | Vasta | 260/29.6 WB |
| 3,875,105 | 4/1975 | Daugherty | 260/33.2 R |
| 3,903,035 | 9/1975 | Affeldt | 260/29.7 H |
| 3,912,520 | 10/1975 | Mijajima | 106/22 |
| 3,949,132 | 4/1976 | Seregely | 117/38 |
| 4,069,188 | 1/1978 | Canard | 260/29.7 H |
| 4,097,289 | 6/1978 | Hofmann | 106/26 |
| 4,097,290 | 6/1978 | Muller | 106/30 |
| 4,101,329 | 7/1978 | Loock | 106/22 |
| 4,130,435 | 12/1978 | Hall | 106/22 |
| 4,130,691 | 12/1978 | Canard | 260/29.7 H |
| 4,139,514 | 2/1979 | Bassett | 260/29.6 H |
| 4,163,001 | 7/1979 | Carumpalos | 260/42.21 |
| 4,165,399 | 8/1979 | Germonprez | 106/22 |

*Primary Examiner*—Paul R. Michl
*Attorney, Agent, or Firm*—Richards, Harris & Medlock

[57] ABSTRACT

An erasable writing medium composition suitable for use in porous tip and ballpoint pens is provided. The erasable writing medium comprises an emulsion having a continuous water phase and discontinuous phase that comprises a styrene-butadiene latex copolymer. The colorant or dye is dissolved in the continuous phase and also is believed to form a surface layer on the discontinuous phase particles. Upon drying, the colorant is captured by the copolymer thereby preventing the colorant from being absorbed by the writing surface.

11 Claims, No Drawings

ERASABLE WRITING MEDIUM COMPOSITION

BACKGROUND OF THE INVENTION

The present invention relates to an erasable writing medium or ink that can be dispensed through a porous tip or ballpoint writing instrument that can be removed with comparative ease with a substantially non-abrasive eraser, such as a common pencil eraser.

In producing written images and characters with writing instruments, obtaining a high degree of indelibility is not necessarily desirable. For example, a person may want a writing medium which is easily removable by mechanical means from the writing surface, i.e., an erasable writing medium. If truly erasable, the writing medium must be capable of being removed from the writing surface to which it has been applied without significant damage, such as abrasion, to the writing surface. Since the most commonly used writing surface is paper, a general discussion of the characteristics and composition of paper is helpful for an understanding of the present invention.

Paper is essentially a mat of randomly distributed cellulose fibers. Because of the random orientation, the paper surface contains numerous voids which exist between the randomly oriented cellulose fibers. Therefore, for a writing medium to be truly erasable, at least that portion of the writing medium that contains the colorant portion of the medium must be prevented from penetrating to any substantial degree into those voids. Otherwise, removal of the colorant by erasing could not be accomplished without some damage in the form of abrasion to the writing surface. Therefore, a need exists for a writing medium that is not absorbed by the writing surface, namely paper, but which writing medium contains a water soluble colorant or dye and can be used in ballpoint and porous tip pens. The writing medium should also resist drying on the tip of the pen but dry relatively rapidly when applied to a writing surface.

SUMMARY OF THE INVENTION

In accordance with the present invention, a writing medium or ink is provided that comprises an emulsion having a discontinuous phase that comprises a styrene-butadiene latex copolymer, a continuous phase of water, and a water soluble colorant or dye. Careful selection of the styrene-butadiene latex copolymer and a proper proportion of the copolymer relative to the continuous phase results in an ink composition which does not penetrate into the voids of a writing surface, such as paper, and which composition is easily erasable from the writing surface for an indefinite period of time.

The compositions according to the present invention allow the use of water soluble dyes, specifically the class known as basic dyes. In addition, the emulsion incorporated into the erasable writing medium compositions allows the writing medium to be easily erasable but to adhere to the paper without chipping or cracking, even when the paper is bent or folded.

Other components, including a plasticizer and antidrying agent are also preferably incorporated into the compositions of the present invention.

DETAILED DESCRIPTION OF THE INVENTION

The erasable writing medium compositions of the present invention comprise an emulsion containing a dye and preferably other components as hereinafter described.

The emulsion is the most important component of the writing medium compositions of the present invention since it determines characteristics such as flow, stability and erasability. According to the present invention, the emulsion is a styrene-butadiene latex containing from about 40% to about 60% water by weight of the total composition. While there are numerous types of styrene-butadiene latexes, care must be exercised in the selection of a styrene-butadiene latex in order for the ink composition to have the desired properties. Since the properties that an emulsion will have cannot always be exactly determined by mere reference to the components of the emulsion because the interactions and synergistic effects of the various components are not completely understood, it is anticipated that some experimentation may be necessary in selecting and compounding styrene-butadiene emulsions that are suitable for use in accordance with the present invention.

For use in accordance with the present invention, the emulsion should possess certain characteristics and parameters which are hereinafter described. The preferred emulsion is a carboxylated styrene-butadiene latex. The styrene-butadiene emulsion should have a viscosity in the range of from about 50 to about 300 cps and preferably from about 100 to about 200 cps. Emulsions which are highly viscous exhibit inadequate flow properties for use in writing instruments and, therefore, should be avoided. However, very low viscosity emulsions, while having better flow characteristics tend to excessively penetrate paper fibers thereby adversely affecting erasability of the ink composition. Therefore, in general, emulsions having a viscosity of less than about 50 cps should not be used. The styrene-butadiene emulsions used in accordance with the invention should have a "low adhesion" to the writing surface. As used herein, "low adhesion" means that the emulsion can be removed from the writing surface, such as paper, with a low abrasion eraser, such as a common pencil eraser, without causing more damage than erasure of a pencil mark would cause. Thus, the emulsion should, after drying (water evaporation) have greater cohesion than adhesion to the writing surface. The emulsion should, when applied to a writing surface, form a cohesive film on the surface, generally within about 20 seconds.

The characteristics of the emulsion are determined in part by the ratio of the number of styrene units to the number of butadiene units in a copolymer chain. For use in accordance with the invention, the styrene-butadiene ratio should be in the range of from about 40:60 to about 55:45. The preferred styrene-butadiene ratio is from about 45:55 to about 50:50. If the styrene-butadiene ratio is much higher than 55:45 the ink composition has a greater tendency to become brittle when dried which could result in cracking and chipping of the ink that has been applied to a writing surface. Therefore, use of a styrene-butadiene ratio greater than 55:45 is not particularly advisable.

In selecting or formulating an emulsion for use in the ink composition of the present invention, it is desirable that the emulsion have a relatively high surface tension thereby minimizing any tendency of the composition to penetrate into the writing surface. Generally, a styrene-butadiene latex emulsion having a surface tension of from about 45 to about 72 dynes/cm is preferred. It is believed that the amount and type of emulsifier present in the latex determines in large part the surface tension of the emulsion. Thus, the type and amount of emulsifier system and the degree of carboxylation of the latex should be adjusted to provide for the maximum surface tension with acceptable stability. Generally, the emulsifier is a soap or a soap system that may contain, for example, a sodium salt of rosin acid, or ammonium caseinate, with a nonionic surfactant such as a polyethoxylated alkylphenol. Carboxylation is achieved in the copolymerization reaction of styrene and butadiene by the presence and reaction of a small amount of a third monomer containing one or more carboxylic acid groups, such as itaconic acid.

It is desirable that the emulsion be highly tacky when dried so that it can easily adhere to, for example, a rubber eraser during the erasing process. It is also preferred that the emulsion have "freeze-thaw" stability and not deteriorate over long periods of shelf-life.

The pH of the emulsion should generally be in the range of from about 6 to about 10. A pH outside of this range is not particularly desirable, since it may result in a composition that is unstable or composition in which the dye cannot dissolve. Further, a composition with a pH outside of the aforesaid range presents difficulty in design and construction of writing instruments. The emulsion will generally be contained in the compositions of the present invention in an amount of from about 95% to about 98% by weight of the total composition.

The most preferred styrene-butadiene emulsion is available from the Union Oil Company of California under the trade designation "AMSCO RES 4176." This compound is a carboxylated, styrene-butadiene latex having a ratio of styrene-butadiene of 50:50, a minimum solids content of about 49.0 percent by weight, a pH of about 9.0, a viscosity of about 200 cps ($\pm 100$) and a surface tension of about 48 dynes/cm. Other styrene-butadiene emulsions which are preferred include the following: "AMSCO RES 4151" and "AMSCO RES 4125," both from the Union Oil Company of California, "GAF 1375," "GAF 4308" and "GAF 4305," all from GAF Corp. of New York, N.Y., "Pliolite PR 4744" from the Goodyear Tire and Rubber Co. of Akron, Ohio, and Dow 283 from the Dow Chemical Company of Midland, Mich.

The colorant or dye present in the erasable ink compositions of the present invention are water-soluble dyes that are selected from the group known as basic dyes, which are the salts of triaryl methyl cations. These dyes are capable of dissolving in the sytrene-butadiene emulsions without significant penetration into a writing surface when the composition is applied to a writing surface, such as paper, for example. Specific dyes which can be used in accordance with the erasable writing medium compositions of the present invention include crystal violet (Basic Violet 3, C.I. 42555), methyl violet 2B (Basic Violet 1, C.I. 42535), rhodamine B (Solvent Red 49, C.I. 45170), Victoria Blue (Basic Blue 26, C.I. 44045), malachite green (Basic Green 4, C.I. 42000), rhodamine 6G (Basic Red 1, C.I. 45160) and mixtures thereof. It is anticipated that other basic dyes may be used in the compositions of the present invention. The dye should be dissolvable in the emulsion, but when the dye-containing emulsion is applied to a writing surface, such as paper, for example, the dye should not penetrate into the paper sufficiently to form visible images in the paper. That is, the dye should not penetrate from the emulsion into the paper fibers or the voids between the paper fibers, since removal of the writing medium by erasing without damage or removal of portion of the paper fiber would then be precluded. Generally, the dye will be present in an amount of from about 0.5% to about 1.0% by weight of the total writing medium composition.

Although the precise mechanism of the invention's operation is not conclusively known, and a theory of operation is not crucial to being able to practice the invention, set forth below is a description summarizing our beliefs as to the mechanism of operation. It is believed that the majority of the dye ions form a surface layer on the discontinuous phase particles of the latex emulsion, with only a small part of the dye being dissolved in the continuous phase. It is probable that the positively charged, color-carrying ions of the dye ionically bond specifically to the negatively charged carboxylate groups of the carboxylated styrene-butadiene polymer. This understanding is supported by the observation that when water-soluble dyes from the class known as acid dyes are employed in the compositions of this invention, written images formed therefrom are not erasable because the dye penetrates and stains the paper fibers. Acid dyes are salts of sulfonic or carboxylic acids and have a low affinity for the negatively charged carboxyate groups in the discontinuous phase. Therefore, acid dyes are believed to remain predominantly dissolved in the continuous phase, which, during writing, may penetrate more deeply into paper fibers than the discontinuous phase, and so the dye is not removable with the polymer during erasure. Our discovery that writing compositions prepared with water-soluble basic dyes according to the present invention are erasable can be explained by the theory that the dye is intimately associated with the discontinuous phase at all times, if the composition is prepared within suitable concentration limits.

In the preferred embodiment, an anti-drying agent is needed to prevent the emulsion from drying on, for example, a pen tip when water from the styrene-butadiene emulsion evaporates, thereby facilitating the smooth flow of ink from the pen, especially after long periods of non-use. Suitable anti-drying agents include water-soluble organic ketones, esters and alcohols that do not have a significant deleterious effect on the composition or its properties and whose boiling-point is relatively high, from about 140° C. to about 300° C. Specific compounds that can be used as anti-drying agents include, for example, 2-octanone, 5-methyl-2-hexanone, cellosolve acetate, glycerol, ethylene glycol, propylene glycol, diethylene glycol and butyl cellosolve (2-butoxyethanol). Of the foregoing anti-drying agents, butyl cellosolve is preferred.

Since the anti-drying agent prevents drying of the emulsion and lowers surface tension, it also facilitates the spreading of the dye on paper or increases the penetration of the dye into, for example, paper fibers. Therefore, it is important that the concentration of the anti-drying agent be kept to a minimum, and, in most cases, the concentration of anti-drying agent should not exceed 2.0% by weight of the total erasable writing medium composition.

The erasable writing medium compositions of the present invention may also optionally include a plasticizer to increase the "tack" of the composition. As previously described, the ink composition is more easily erasable if it is tacky. The plasticizer improves the tackiness of the composition and, therefore, provides a composition which is more easily erasable with an ordinary non-abrasive eraser. Any plasticizer which is compatible with the compositions of the present invention may be utilized. The preferred plasticizer is dipropylene glycol dibenzoate which is marketed under the trade name "Benzoflex 9-88" by the Velsicol Chemical Corporation of Chattanooga, Tenn. Another preferred plasticizer is marketed under the trade name "Santicizer 8" by the Monsanto Industrial Chemicals Co. of St. Louis, Mo. "Santicizer 8" is a mixture of N-ethyl-ortho-toluene sulfonamides and N-ethyl-para-toluene sulfonamides.

The compositions according to the present invention can be utilized in fiber tip and ball point pens. As used herein, "ball point" includes conventional ball point pens and those pens with a rolling ball tip that contacts a wick and is generally used with a writing medium that is less viscous than that used in regular ball point pens. The preferred pen design includes a plastic nib having a rolling ball tip contacted by a polyamide fiber feed rod. Such an apparatus is sold by the Glasrock Company of Fairburn, Ga., under the product designation No. 860. Preferably, the tip apparatus is connected to an ink reservoir sold under the trademark Transorb bonded acetate filter reservoir by the American Filtrona Company of Richmond, Va., under the stock designation No. R7613. This reservoir is 6.4 mm in diameter and 93.6 mm long and contains a longitudinal groove to prevent vacuum formation within the reservoir.

EXAMPLE 1

An erasable writing medium in accordance with the invention was prepared and had the following composition:

| Component | Percent By Weight |
| --- | --- |
| AMSCO RES 4176 | 96.3 |
| Methyl Violet 2B | 0.7 |
| Butyl Cellosolve | 2.0 |
| Santicizer 8 | 1.0 |

Methyl violet is stirred into the emulsion at low shear until dissolved completely. Then butyl cellosolve and Santicizer 8 are added to form the resulting mixture. The resulting mixture is stirred at low speed for approximately ten minutes. This mixture is then filtered by gravity through filter paper or by pumping through a 50 micron rated pressed fiber filter to remove any undissolved particles.

EXAMPLE 2

A red erasable writing medium was prepared in accordance with the invention having the following composition:

| Component | Percent by Weight |
| --- | --- |
| AMSCO RES 4176 | 96.5 |
| Rhodamine B | 0.5 |
| Butyl Cellosolve | 1.0 |
| Santicizer 8 | 1.0 |
| Benzoflex 9-88 | 1.0 |

This composition was prepared in the same manner as described in Example 1. It is believed that the combination of Santicizer 8 and Benzoflex 9-88 results in a more stable final ink composition than a composition containing only Santicizer 8 because Santicizer 8 is substantially insoluble in water.

While the invention has been described with respect to preferred embodiments, it is evident that upon reading the specification, numerous changes, modifications and substitutions will be apparent and are intended to be within the scope of the appended claims.

We claim:

1. A writing medium composition that is erasable by an ordinary pencil eraser and suitable for use in ballpoint or porous tip pens comprising:
   (a) a carboxylated styrene-butadiene latex emulsion, said emulsion having a styrene-butadiene ratio of from about 40:60 to about 55:45, a viscosity of from about 50 to about 300 cps, a pH of from about 6 to about 10, a surface tension of from about 45 dynes per cm to about 72 dynes per cm and containing from about 40% to about 60% water by weight of said emulsion, said emulsion being further characterized by its ability to rapidly form a cohesive film at ambient temperature on a dry writing surface and having a low adhesion to paper to permit removal therefrom with an ordinary pencil eraser; and
   (b) a basic dye that is a salt of a triarylmethyl cation which is dissolvable in said emulsion but which dye, when combined with said emulsion, does not, when said emulsion is applied to paper, penetrate into the paper fibers or paper voids sufficiently to form visible images on the paper.

2. The erasable writing medium composition as recited in claim 1 wherein said dye is selected from the group consisting of crystal violet, methyl violet 2B, rhodamine B, Victoria blue B, malachite green, rhodamine 6G and mixtures thereof.

3. The erasable writing medium composition as recited in claim 1 further comprising:
   (a) an anti-drying agent; and
   (b) a plasticizer.

4. The erasable writing medium composition as recited in claim 3 wherein:
   (a) said emulsion is present in an amount of from about 95% to about 98% by weight of said total erasable writing composition;
   (b) said dye is present in an amount of from about 0.5% to about 1.0% by weight of said total erasable writing medium composition;
   (c) said anti-drying agent is present in an amount of up to about 2.0% by weight of said total erasable writing medium composition; and
   (d) said plasticizer is present in an amount of up to about 2.0% by weight of said total erasable writing medium composition.

5. The erasable writing medium composition as recited in claim 4 wherein said anti-drying agent is selected from the group consisting of ketones, esters and alcohols that have boiling points of from about 140° C. to about 300° C.

6. The erasable writing medium composition as recited in claim 4 wherein said anti-drying agent is selected from the group consisting of 2-octanone, 5-methyl-2-hexanone, cellosolve acetate, glycerol, ethylene glycol, propylene glycol, diethylene glycol and butyl cellosolve.

7. The erasable writing medium composition as recited in claim 4 wherein said plasticizer is selected from the group consisting of dipropylene glycol dibenzoate, a mixture of N-ethyl-ortho-toluene sulfonamides and N-ethyl-para-toluene sulfonamides and mixtures thereof.

8. A writing medium composition that is erasable with an ordinary pencil eraser and suitable for use in ballpoint and porous tip pens comprising:
   (a) a carboxylated styrene-butadiene latex emulsion, said emulsion having a styrene-butadiene ratio of from about 40:60 to about 55:45, a viscosity of from about 50 to about 300 cps, a pH of from about 6 to about 10, a surface tension of from about 45 dynes per cm to about 72 dynes per cm and containing from about 40% to about 60% water by weight of said emulsion, said emulsion being further characterized by its ability to rapidly form a cohesive film at ambient temperature on a dry writing surface and having a low adhesion to paper to permit removal therefrom with an ordinary pencil eraser, said emulsion being present in an amount of from about 95% to about 98% by weight of said erasable writing medium composition;
   (b) a dye selected from the group consisting of crystal violet, methyl violet 2B, rhodamine B, Victoria blue B, malachite green, rhodamine 6G and mixtures thereof, said dye being present in an amount of from about 0.5% to about 1.0% by weight of said erasable writing medium composition;
   (c) an anti-drying agent selected from the group consisting of ketones, esters and alcohols having boiling points of from about 140° C. to about 300° C., said anti-drying agent present in an amount of up to about 2.0% by weight of said total erasable writing medium composition; and
   (d) a plasticizer present in an amount of up to about 2.0% by weight of said total erasable writing medium composition.

9. The erasable writing medium composition wherein said anti-drying agent is selected from the group consisting of ketones, esters and alcohols that have boiling points of from about 140° C. to about 300° C.

10. The erasable writing medium as recited in claim 8 wherein said anti-drying agent is selected from the group consisting of 2-octanone, 5-methyl-2-hexanone, cellosolve acetate, glycerol, ethylene glycol, propylene glycol, diethylene glycol and butyl cellosolve.

11. The erasable writing medium as recited in claim 8 or 10 wherein said plasticizer is selected from the group consisting of dipropylene glycol dibenzoate, a mixture of N-ethyl-ortho-toluene sulfonamides and N-ethyl-para-toluene sulfonamides and mixtures thereof.

* * * * *